(12) United States Patent
Yamada et al.

(10) Patent No.: US 7,662,420 B2
(45) Date of Patent: Feb. 16, 2010

(54) PACKAGED TEA BEVERAGE

(75) Inventors: Yasushi Yamada, Tokyo (JP); Chitoshi Shigeno, Tokyo (JP)

(73) Assignee: Kao Corporation, Tokyo (JP)

( * ) Notice: Subject to any disclaimer, the term of this patent is extended or adjusted under 35 U.S.C. 154(b) by 702 days.

(21) Appl. No.: 10/544,382

(22) PCT Filed: Dec. 24, 2003

(86) PCT No.: PCT/JP03/16555

§ 371 (c)(1),
(2), (4) Date: Aug. 3, 2005

(87) PCT Pub. No.: WO2004/068961

PCT Pub. Date: Aug. 19, 2004

(65) Prior Publication Data

US 2006/0073242 A1    Apr. 6, 2006

(30) Foreign Application Priority Data

Feb. 4, 2003    (JP) .............................. 2003-027547

(51) Int. Cl.
*A23B 7/148*    (2006.01)
(52) U.S. Cl. ................. 426/597; 426/590; 426/599
(58) Field of Classification Search .......... 426/590–599
See application file for complete search history.

(56) References Cited

U.S. PATENT DOCUMENTS

| | | | | |
|---|---|---|---|---|
| 4,946,701 A | * | 8/1990 | Tsai et al. ................... | 426/597 |
| 5,681,569 A | * | 10/1997 | Kuznicki et al. ............ | 424/439 |
| 5,863,581 A | * | 1/1999 | Barrett et al. ............... | 426/250 |
| 5,922,380 A | | 7/1999 | Takihara et al. | |
| 6,268,009 B1 | * | 7/2001 | Ekanayake et al. .......... | 426/597 |
| 2006/0099318 A1 | * | 5/2006 | Iwasaki et al. .............. | 426/590 |
| 2007/0092624 A1 | * | 4/2007 | Iwasaki et al. .............. | 426/597 |
| 2007/0104851 A1 | * | 5/2007 | Iwasaki et al. .............. | 426/597 |
| 2007/0141219 A1 | * | 6/2007 | Iwasaki et al. .............. | 426/597 |
| 2008/0292767 A1 | | 11/2008 | Iwasaki et al. | |
| 2008/0292772 A1 | | 11/2008 | Iwasaki et al. | |
| 2009/0148554 A1 | * | 6/2009 | Kataoka et al. ................ | 426/2 |

FOREIGN PATENT DOCUMENTS

| | | |
|---|---|---|
| JP | 60-196149 | 10/1985 |
| JP | 61-209573 | 9/1986 |
| JP | 02-291230 | 12/1990 |
| JP | 03-277236 | 12/1991 |
| JP | 10-165096 | 6/1998 |
| JP | 2002-233333 | 8/2002 |
| JP | 2003-128664 | 5/2003 |
| WO | 95/33385 | 12/1995 |
| WO | 02/39822 | 5/2002 |

* cited by examiner

*Primary Examiner*—Anthony Weier
(74) *Attorney, Agent, or Firm*—Oblon, Spivak, McClelland, Maier & Neustadt, L.L.P.

(57) ABSTRACT

This invention relates to packaged beverages, which contain the following ingredients:
(A) from 0.05 to 0.5 wt % of non-polymer catechins,
(B) from 0.008 to 0.033 wt % of sodium, and
(C) potassium.

The weight ratio of ingredient (B) to ingredient (C) and pH fall within specific ranges, respectively.

17 Claims, No Drawings

PACKAGED TEA BEVERAGE

FIELD OF THE INVENTION

This invention relates to a packaged beverage containing non-polymer catechins at a high concentration.

BACKGROUND OF THE INVENTION

As effects of catechins, there have been reported a suppressing effect on an increase in cholesterol level and an inhibitory effect on α-amylase activity. To make such physiological effects activated, it is necessary for an adult to drink 4 to 5 cups of tea in a day. Accordingly, it has been demanded to develop a technique that permits the addition of catechins at a high concentration in beverages to facilitate the ingestion of a large amount of catechins. As one of such methods, catechins are added in a dissolved form to a beverage by using a concentrate, purified product or the like of a tea extract.

However, a beverage containing non-polymer catechins at a high concentration causes strong bitterness and astringency when drunken, and therefore, is not suited for habitual drinking. So far, there has been reported a method which includes adding a high molecular substance such as cyclic oligosaccharide, as a method for reducing bitterness and astringency (JP-B-2566801). However, a beverage containing non-polymer catechins at a high concentration requires a large amount of cyclic oligosaccharide and, if cyclic oligosaccharide is added excessively, the inherent flavor and taste of the beverage could be impaired by its flavor and taste. Further, when stored over a long time after its production a beverage with a concentrate or purified product of a tea extract added therein, develops grouts and precipitates and cause considerable damage to its external appearance. Conventional tea beverages, especially green tea beverages may also develop grouts and precipitates during storage, and in the case of beverages with a concentrate or purified product of a green tea extract added therein, the damage in their external appearance is more critical. The grouts and precipitates in green tea beverages are considered to stem from the formation of complexes from components such as polysaccharides, proteins, polyphenols and metal ions. The mechanisms of formation of grouts and precipitates are complicated problems though a variety of countermeasures have been considered to date. As countermeasures directed to high-molecular components in green tea, for example, there have been reported methods for suppressing the formation of grouts by degrading components, which would otherwise form high molecular complexes, into lower molecular weight substances by enzymatic treatment (JP-A-05-328901, JP-A-11-308965); and a method for suppressing the formation of grouts by fractionating green tea components through an ultra filtration membrane to substantially eliminate high molecular substances whose molecular weights are 10,000 and higher (JP-A-04-045744). As a countermeasure directed to metal ions, on the other hand, there has been reported a method for reducing coloring and turbidity by conducting treatment with a cation exchange resin, followed by nanofiltration (JP-A-11-504224) There has also been reported a method, which includes conducting a cation exchange resin treatment with a cation exchange resin on which potassium ions have been bonded beforehand (JP-A-10-165098).

DISCLOSURE OF THE INVENTION

The present invention relates to a packaged beverage containing the following ingredients (A), (B) and (C):
(A) from 0.05 to 0.5 wt % of non-polymer catechins,
(B) from 0.008 to 0.033 wt % of sodium, and
(C) potassium,
wherein a weight ratio (B/C) of ingredient (B) to ingredient (C) is from 1 to 330, and a pH is 2 or higher but lower than 6.5.

The present invention is also concerned with a process for producing a packaged beverage by mixing an extract of a tea material selected from green tea, semi-fermented tea or fermented tea with a concentrate or purified product of a green tea extract, which process includes bringing the extract of the tea material and the concentrate or purified product, or a mixture thereof into contact with a $Na^+$ cation exchange resin.

DETAILED DESCRIPTION OF THE INVENTION

The conventional countermeasures, such as a method that purposed for substantially eliminating high molecular components by ultrafiltration or nanofiltration, have a drawback in that the dainty components of tea largely disappear and thus the flavor and taste specific to tea become scarce, even though the formation of grouts and precipitates are effectively reduced. When enzymatic treatment is conducted, on the other hand, the inherent flavor and taste of tea could be detrimentally affected by the taste of the enzyme itself.

The present invention, therefore, relates to a packaged beverage, which contains non-polymer non-polymer catechins at a high concentration, has a refined taste, and is free from the formation of grouts and precipitates even when stored over long time.

The present inventors have proceeded with various investigations to suppress the formation of grouts in such a packaged beverage containing non-polymer catechins at high concentration precipitates during long-term storage while retaining the flavor and taste specific to tea. As a result, it has been found that, when the concentration of catechins is as low as about 0.02 wt %, a green tea extract treated with a $Na^+$ cation exchange resin is poor in refined taste but a green tea extract treated with a $K^+$ cation exchange resin as disclosed in JP-A-10-165098 referred to in the above is good in refined taste. In the case of a beverage having a non-polymer catechin concentration as high as 0.05 to 0.5 wt %, its flavor, taste and long-term storage stability are unexpectedly improved when it is treated with a $Na^+$ cation exchange resin such that the concentration of sodium becomes equal to, or higher than, the concentration of potassium.

The beverage according to the present invention contains non-polymer catechins at a high concentration, has a refined flavor, taste and a refreshing feeling, is free from the formation of grouts and precipitates even when stored over long time, and is suited for daily drinking.

The term "non-polymer catechins (A)" as used herein is a generic term, which collectively encompasses non-epicatechins such as catechin, gallocatechin, catechingallate and gallocatechin gallate, and epicatechins such as epicatechin, epigallocatechin, epicatechin gallate, epigallocatechin gallate. The term "concentration of non-polymer catechins" as used herein is defined based on the total amount of the above-described eight types of catechins.

The packaged beverage according to the present invention contains from 0.05 to 0.5 wt % of the non-polymer catechins (A), which are non-polymer and are in water-dissolved forms. However, the content of the non-polymer catechins (A) may be preferably from 0.06 to 0.5 wt %, more preferably from 0.07 to 0.5 wt %, more preferably from 0.08 to 0.5 wt %, still more preferably from 0.09 to 0.5 wt %, still more preferably from 0.092 to 0.4 wt %, still more preferably from 0.11 to 0.3 wt %, yet still more preferably from 0.12 to 0.3 wt %. When the content of the non-polymer catechins falls within the above-described range, a large amount of the non-polymer catechins can be ingested with ease so that the non-polymer catechins tend to be effectively absorbed into the body without producing strong bitterness, astringency and sharp puckeriness. The concentration of the non-polymer catechins can be adjusted depending on the amount of the concentrate or purified product of the green tea extract to be added.

It is preferred that the ratio of the gallocatechins—which as a generic term, consist of epigallocatechin gallate, gallocatechin gallate, epigallocatechin and gallocatechin—to the nongallocatechins—which as a generic term, consist of epicatechin gallate, catechingallate, epicatechin and catechin—in the non-polymer catechins in the packaged beverage according to the present invention should retain the composition in natural green tea leaves. From the standpoint of also retaining the catechin composition of natural green tea leaves in the beverage, it is preferred that the total amount of the four types of gallocatechins should be always greater than the four types of nongallocatechins.

The proportion of gallates—which as a generic term, consist of catechingallate, epicatechin gallate, gallocatechin gallate and epigallocatechin gallate—in the entire non-polymer catechins in the packaged beverage according to the present invention may preferably be 45 wt % or greater from the standpoint of the effectiveness of the physiological effects of the non-polymer catechins.

The concentration of sodium (B) in the packaged beverage according to the present invention is from 0.008 to 0.033 wt %. However, the concentration of sodium (B) may be preferably from 0.010 to 0.030 wt %, more preferably from 0.016 to 0.027 wt %, still more preferably from 0.018 to 0.025 wt %. A sodium concentration lower than 0.008 wt % cannot bring about its reducing effects on the bitterness and astringency of the beverage, while a sodium concentration higher than 0.033 wt %, when consumed, leaves the taste of sodium itself, resulting in a loss of a refreshing feel. Further, the weight ratio (B/C) of the ingredient (B) to the ingredient (C) is from 1 to 300. However, the weight ratio (B/C) may be preferably from 1.5 to 300, more preferably from 1.8 to 200, still more preferably from 2.0 to 50. When the weight ratio of the ingredient (B) to the ingredient (C) falls within this range, the beverage gives no strong bitterness or astringency while retaining the flavor and taste specific to tea, even if non-polymer catechins are contained abundantly. In addition, the formation of grouts and precipitates is suppressed during long-term storage. When the ingredient (C) is contained more than the ingredient (B), on the other hand, when consumed, the beverage causes sharp bitterness and astringency, leading to reductions in flavor and taste.

From the standpoint of the chemical stability of the non-polymer catechins, it is preferred to control the pH of the packaged beverage according to the present invention to 2 or more but lower than 6.5, more preferably to 3 to 6.4, still more preferably to 5 to 6.4, at 25° C.

As a method for increasing the concentration of sodium as the ingredient (B) and controlling the weight ratio of the ingredient (B) to the ingredient (C) within the above-described range, the addition of a sodium salt such as sodium hydrogencarbonate can be mentioned. The addition of such a sodium salt, however, results in a pH of 6.5 or higher, which is not preferred from the standpoint of the chemical stability of the non-polymer catechins, leading to a further reduction in flavor and taste.

To the packaged beverage according to the present invention, it is possible to add, in combination with the ingredients derived from tea, additives- such as antioxidants, flavors, various esters, organic acids, organic acid salts, inorganic acids, inorganic acid salts, inorganic salts, colorants, emulsifiers, preservatives, seasoning agents, sweeteners, sour seasonings, fruit extracts, vegetable extracts, flower honey extracts, pH regulators and quality stabilizers—either singly or in combination.

Examples of the sweeteners include sugar, glucose, fructose, isomerized syrup, glycyrrhizin, stevia, aspartame, fructooligosaccharide, and galactooligosaccharide. Examples of the sour seasonings include, in addition to fruit juices and the like extracted from natural sources, citric acid, tartaric acid, malic acid, lactic acid, fumaric acid, and phosphoric acid. These sour seasonings may be contained preferably in an amount of from 0.01 to 0.5 wt %, with from 0.01 to 0.3 wt % being more preferred, in the packaged beverage according to the present invention. Examples of the inorganic acids and inorganic acid salts include phosphoric acid, disodium phosphate, sodium metaphosphate, and sodium polyphosphate. These inorganic acids and inorganic acid salts may be contained preferably in an amount of from 0.01 to 0.5 wt %, with from 0.01 to 0.3 wt % being more preferred, in the packaged beverage according to the present invention.

It is preferred to produce the packaged beverage according to the present invention by adding a concentrate or purified product of a green tea extract to an extract of a tea material selected from green tea, semi-fermented tea or fermented tea.

Examples of the concentrate or purified product of the green tea extract include "Polyphenon" (product of Mitsui Norin Co., Ltd.), "TEAFURAN" (product of ITO EN, LTD.) and "SUNPHENON" (product of Taiyo Kagaku Co., Ltd.), all of which are available in the market. They can also be used after repurification. As an illustrative repurification method, a concentrate of a green tea extract is suspended in water or a mixture of water and an organic solvent; an organic solvent is added to the suspension; the resulting precipitates are removed; and then, the solvent is distilled off. As an alternative, an extract obtained from tea leaves with hot water or a water-soluble organic solvent is concentrated and then purified further, or the extract so obtained is directly purified. As the form of the concentrate or purified product of the green tea extract, various forms can be mentioned including a solid, an aqueous solution and a slurry.

The extract of the tea material, which is employed in the packaged beverage according to the present invention, can be an extract of tea selected from green tea, semi-fermented tea or fermented tea. Illustrative examples of the semi-fermented tea is oolong tea, and black tea is mentioned as an illustrative example of the fermented tea.

Examples of the green tea for use in the present invention include tea leaves prepared from tea leaves of the Genus *Camellia*, for example, *C. sinensis*, *C. assamica* and the Yabukita variety, or their hybrids. The prepared tea leaves include sencha (middle-grade green tea), bancha (coarse green tea), gyokuro (shaded green tea), tencha (powdered tea), and kamairidha (roasted tea).

To control the concentrations of the component (B) and component (C) in the packaged beverage according to the present invention within the above-described ranges, respectively, it is preferred to bring one or a mixture of the above-described extract of the tea material and the above-described concentrate or purified product into contact with a Na$^+$ cation exchange resin. As cation exchange resins useful in the above-described adjustment, resins which contain sulfonic groups, carboxyl groups, phosphate groups or the like can be used. Specific examples include, but are not limited to, resins such as the SK series led by "Diaion SK-1B" and the PK series led by "Diaion PK-208" (products of Mitsubishi Chemicals Corporation), the #100 series led by "Amberlite IR-116" (products of Rohm and Haas Company), the W series led by "Dowex 50W-X1" (product of Dow Chemicals Company), and chelate resin "Diaion CR-10" (product of Mitsubishi Chemicals Corporation). To convert these cation exchange resins into Na$^+$ forms, it is necessary only to make them bonded to sodium ions. More specifically, the conversion can be effected by bringing an appropriate aqueous solution of sodium chloride or sodium hydroxide into contact with the cation exchange resins.

The contact between the raw material or the mixture with the Na$^+$ cation exchange resin can be carried out batchwise, semi-batchwise, semi-continuously, or continuously, although it is preferred to pack a column with the resin and to make the raw material or the mixture continuously pass through the column.

Similar to general beverages, a container useful for the packaged beverage according to the present invention can be provided in an ordinary form such as a molded container made of polyethylene terephthalate as a principal component (so-called PET bottle), a metal can, a paper container combined with metal foils or plastic films, or a bottle. The term "packaged beverage" as used herein means a beverage which can be consumed without dilution.

The packaged beverage according to the present invention can be produced, for example, by filling the beverage in a container such as a metal can and, when heat sterilization is feasible, conducting heat sterilization under sterilization conditions as prescribed in the Food Sanitation Act. For those not suitable for retort sterilization, such as PET bottles or paper containers, it is possible to adopt a method by which the beverage is sterilized beforehand under similar sterilization conditions as those described above, for example, at a high temperature for a short time by a plate-type heat exchanger, is cooled to a particular temperature, and is then filed in a container. Under aseptic conditions, additional ingredients maybe added to and filled in a filled container.

EXAMPLES

Measurement of Non-polymer Catechins

A high-performance liquid chromatograph (model: SCL-10Avp) manufactured by Shimadzu Corporation was used. The chromatograph was fitted with an L column packed with octadecyl-introduced silica gel, "L-Column, TM ODS" (4.6 mm in diameter×250 mm in length; product of Chemicals Evaluation and Research Institute, Japan). A packaged beverage, which had been filtered through a filter (0.45 μm) and then diluted with distilled water, was subjected to chromatography at a column temperature of 35° C. by gradient elution. A 0.1 mol/L solution of acetic acid in distilled water and a 0.1 mol/L solution of acetic acid in acetonitrile were fed as mobile phase solution A and mobile phase solution B, respectively, at flow rates of 1.0 mL/min. The gradient conditions were set as follows:

| Time | Solution A | Solution B |
|---|---|---|
| 0 min | 97% | 3% |
| 5 min | 97% | 3% |
| 37 min | 80% | 20% |
| 43 min | 80% | 20% |
| 43.5 min | 0% | 100% |
| 48.5 min | 0% | 100% |

The measurement was conducted under the conditions of 10 μL injected sample quantity and 280 nm UV detector wavelength.

Measurement of the Concentration of Sodium
  The ICP emission spectroscopy was applied.

Measurement of the Concentration of Potassium
  The ICP emission spectroscopy was applied.

Ranking in Grouts and Precipitates During Storage
  The ranking was performed by an accelerated storage test. Each packaged beverage was stored in an incubator controlled at 55° C. for 5 days, subsequently, its outer appearance was visually ranked.
  Ranking in grouts and precipitates:
    −: Neither grouts nor precipitates were formed.
    ±: Small grouts were slightly formed but, when the beverage in the container was caused to move, immediately disappeared.
    +: Small grouts and precipitates were formed a little.
    ++: Large grouts and precipitates were formed abundantly.
  Ranking in flavor and taste:
    A: Very good.
    B: Somewhat awkward.
    C: Poor.

Production Example 1

Green tea leaves (144 g) from Miyazaki pref. were added to deionized water (4.3 kg) which had been heated to 65° C., followed by extraction for 5 minutes. The tea leaves were then removed from the extract, and the extract was cooled to 25° C. or lower by a heat exchanger. By flannel filtration, precipitates and suspended matters were next removed from the extract (flannel filtrate). The flannel filtrate was passed at room temperature through a column packed with a Na$^+$ cation exchange resin ("Diaion SK-1B"). The amount of the resin was set at 0.25 wt % based on the final beverage product. Subsequently, the extract was filtered through a disc-shaped depth filter ("Zeta Plus 10C"). On the other hand, a commercially-available concentrate (100 g; "Polyphenon HG", product of Mitsui Norin Co., Ltd.) of a green tea extract was dispersed in 99.5wt % ethanol (630 g). Subsequent to dropwise addition of water (270 g) over 10 minutes, the resulting mixture was allowed to age for 30 minutes. The mixture was filtered through No.2 filter paper and a filter paper having 0.2 μm pore size, and water (200 mL) was added. The thus-prepared mixture was concentrated under reduced pressure and then lyophilized to obtain a repurified product. To the above-obtained extract, the repurified product was added. The thus-obtained solution was diluted, followed by the addition of vitamin C. After being adjusted to pH 6.2 with sodium hydrogencarbonate, the mixture was subjected to UHT sterilization and filled in PET bottles. The results of an analysis of that beverage and the results of its rankings in grouts and precipitates and refined taste are shown in Table 1.

Production Example 2

Green tea leaves (135 g) from Shizuoka pref. were added to deionized water (4 kg) which had been heated to 65° C., followed by extraction for 5 minutes. The tea leaves were then removed from the extract, and the extract was cooled to 25° C. or lower by a heat exchanger. The extract was passed at room temperature through a column packed with a $Na^+$ cation exchange resin ("Diaion SK-1B"). The amount of the resin was set at 0.5 wt % based on the final beverage product. To the thus-obtained solution, a product which had been obtained by repurifying the commercially-available, concentrated green tea extract under the same condition as in Production Example 1 was added. Subsequently, the solution was filtered through a disc-shaped depth filter ("Zeta Plus 10C"). Subsequent to dilution, vitamin C was added. The solution was adjusted to pH 6.3 with sodium hydrogencarbonate, and subjected to UHT sterilization, and then filled in PET bottles. The results of an analysis of that beverage and the results of its rankings in grouts and precipitates and refined taste are shown in Table 1.

Production Example 3

Green tea leaves (135 g) from Shizuoka pref. were added to deionized water (4 kg) which had been heated to 80° C., followed by extraction for 5 minutes. The tea leaves were then removed from the extract, and the extract was cooled to 25° C. or lower by a heat exchanger. To the thus-obtained extract, a product which had been obtained by repurifying the commercially-available, concentrated green tea extract under the same condition as in Production Example 1 was added. The resulting solution was passed at room temperature through a column packed with a $Na^+$ cation exchange resin ("Diaion SK-1B") The amount of the resin was set at 0.5 wt % based on the final beverage product. Subsequently, the thus-obtained solution was filtered through a disc-shaped depth filter ("Zeta Plus 10C"). Subsequent to dilution, vitamin C was added. The solution was adjusted to pH6.3 with sodium hydrogen carbonate, subjected to UHT sterilization, and then filled in PET bottles. The results of an analysis of that beverage and the results of its rankings in grouts and precipitates and refined taste are shown in Table 1.

Production Example 4

A flannel filtrate of a green tea extract was obtained under the same conditions as in Production Example 1. The flannel filtrate was passed at room temperature through a column packed with a $Na^+$ cation exchange resin ("Diaion SK-1B"). The amount of the resin was set at 0.1 wt % based on the final beverage product. To the thus-obtained solution, a product which had been obtained by repurifying the commercially-available, concentrated green tea extract under the same condition as in Production Example 1 was added such that the concentration of catechins became 700 mg/L. Subsequently, the solution was filtered through a disc-shaped depth filter ("Zeta Plus 10C"). Subsequent to dilution, vitamin C was added. The solution was adjusted to pH 6.3 with sodium hydrogencarbonate, subjected to UHT sterilization, and then filled in PET bottles. The results of an analysis of that beverage and the results of its rankings in grouts and precipitates and refined taste are shown in Table 1.

Referential Example 1

A flannel filtrate of a green tea extract was obtained under the same conditions as in Production Example 1. The flannel filtrate was filtered through a disc-shaped depth filter ("Zeta Plus 10C"). To the resulting filtrate, a product which had been obtained by repurifying the commercially-available, concentrated green tea extract under the same condition as in Production Example 1 was added. Subsequent to dilution, vitamin C was added. The solution was adjusted to pH6.2 with sodium hydrogen carbonate, subjected to UHT sterilization, and then filled in PET bottles. The results of an analysis of that beverage and the results of its rankings in grouts and precipitates and refined taste are shown in Table 1.

Referential Example 2

A flannel filtrate of a green tea extract was obtained under the same conditions as in Production Example 1. To the resulting filtrate, a product which had been obtained by repurifying the commercially-available, concentrated green tea extract under the same condition as in Production Example 1 was added. A 5% solution of potassium chloride was passed through a column packed with a cation exchange resin ("Diaion SK-1B"). Subsequent to washing the column with water, the tea extract was passed at room temperature through the column. The amount of the resin was set at 0.5 wt % based on the final beverage product. The resulting solution was filtered through a disc-shaped depth filter ("Zeta Plus 10C"). Subsequent to dilution, vitamin C was added. The solution was adjusted to pH 6.3 with sodium hydrogencarbonate, and subjected to UHT sterilization, and then filled in PET bottles. The results of an analysis of that beverage and the results of its rankings in grouts and precipitates and refined taste are shown in Table 1.

Referential Example 3

A flannel filtrate of a green tea extract was obtained under the same conditions as in Production Example 1. The flannel filtrate was filtered through a disc-shaped depth filter ("Zeta Plus 10C"). To the resulting filtrate, a product which had been obtained by repurifying the commercially-available, concentrated green tea extract under the same condition as in Production Example 1 was added. Subsequent to dilution, vitamin C was added. The solution was adjusted to pH6.7 with sodium hydrogen carbonate, subjected to UHT sterilization, and then filled in PET bottles. The results of an analysis of that beverage and the results of its rankings in grouts and precipitates and refined taste are shown in Table 1.

TABLE 1

|  | (A) Non-polymer catechins [mg/L] | (B) Concentration of Na [mg/L] | (C) Concentration of K [mg/L] | Na/K | pH (25° C.) | Grouts and precipitates after stored at 55° C. for 5 days | Refined taste |
| --- | --- | --- | --- | --- | --- | --- | --- |
| Production Example 1 | 1749 | 200 | 89.1 | 2.2 | 6.2 | − | A |
| Production Example 2 | 1718 | 207 | 96.2 | 2.2 | 6.1 | − | A |
| Production Example 3 | 1733 | 237 | 1.3 | 182.3 | 6.2 | − | A |
| Production Example 4 | 706 | 88 | 20.1 | 4.4 | 6.3 | − | A |
| Referential Example 1 | 1810 | 149 | 205 | 0.7 | 6.2 | ++ | C |
| Referential Example 2 | 1744 | 141 | 209 | 0.7 | 6.0 | ± | B |
| Referential Example 3 | 1789 | 345 | 198 | 1.7 | 6.5 | − | C |

In Examples 1-4, even after the accelerated storage, neither grouts nor precipitates were observed, and the flavor and taste were good. In Referential Example 1, on the other hand, a sharp bitterness was felt, and during storage, large grouts were formed. In Referential Example 2, a bitterness was also felt strongly so that the refined taste specific to tea was impaired. In Comparative Example 3, the flavor and taste of sodium bicarbonate was strongly felt so that the beverage became too intolerable to drink.

The invention claimed is:

1. A packaged tea beverage comprising the following ingredients (A), (B) and (C):
    (A) from 0.05 to 0.5 wt % of non-polymer catechins,
    (B) from 0.008 to 0.033 wt % of sodium, and
    (C) potassium,
    wherein a weight ratio (B/C) of ingredient (B) to ingredient (C) is from 1 to 330, and a pH is from at least 5 to less than 6.5.

2. The packaged beverage according to claim 1, which comprises an extract of a tea selected from green tea, semi-fermented tea or fermented tea and a concentrate or purified product of a green tea extract added thereto.

3. The packaged beverage according to claim 1, which is a green tea beverage.

4. The packaged beverage according to claim 1, wherein a percentage of gallates in said non-polymer catechins is at least 45 wt %.

5. The packaged beverage according to claim 1, wherein (B/C) is from 1.5 to 300.

6. A process for producing a packaged beverage as defined in claim 1 by mixing an extract of a tea material selected from green tea, semi-fermented tea or fermented tea with a concentrate or purified product of a green tea extract, which comprises bringing one or a mixture of the extract of the tea material and the concentrate or purified product into contact with a $Na^+$ cation exchange resin.

7. The packaged beverage according to claim 1, wherein the content of the non-polymer catechins ranges from 0.12 to 0.3 wt %.

8. The packaged beverage according to claim 1, wherein the content of sodium ranges from 0.018 to 0.025 wt %.

9. The packaged beverage according to claim 1, wherein a weight ratio (B/C) of ingredient (B) to ingredient (C) is from 2.0 to 50.

10. The packaged beverage according to claim 1, further comprising at least one additive selected from the group consisting of antioxidants, flavors, various esters, organic acids, organic acid salts, inorganic acids, inorganic acid salts, inorganic salts, colorants, emulsifiers, preservatives, seasoning agents, sweeteners, sour seasonings, fruit extracts, vegetable extracts, flower honey extracts, pH regulators and quality stabilizers.

11. The packaged beverage according to claim 10, wherein a sweetner is present and said sweetener is selected from the group consisting of sugar, glucose, fructose, isomerized syrup, glycyrrhizin, stevia, aspartame, fructooligosaccharide, and galactooligosaccharide.

12. The packaged beverage according to claim 10, wherein a sour seasoning is present and said sour seasoning is selected from the group consisting of fruit juice extracted from a natural source, citric acid, tartaric acid, malic acid, lactic acid, fumaric acid, and phosphoric acid.

13. The packaged beverage according to claim 12, wherein the sour seasoning is contained in an amount ranging from 0.01 to 0.5 wt %.

14. The packaged beverage according to claim 10, wherein an inorganic acid and/or an inorganic acid salt is present and said inorganic acid and/or an inorganic acid salt is selected from the group consisting of phosphoric acid, disodium phosphate, sodium metaphosphate, and sodium polyphosphate.

15. The packaged beverage according to claim 14, wherein an inorganic acid and/or an inorganic acid salt is contained in an amount ranging from 0.01 to 0.5 wt %.

16. The packaged beverage according to claim 1, wherein said tea is oolong tea.

17. The packaged beverage according to claim 1, wherein said tea is black tea.

\* \* \* \* \*

UNITED STATES PATENT AND TRADEMARK OFFICE
CERTIFICATE OF CORRECTION

PATENT NO. : 7,662,420 B2
APPLICATION NO. : 10/544382
DATED : February 16, 2010
INVENTOR(S) : Yamada et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1202 days.

Signed and Sealed this

Thirtieth Day of November, 2010

David J. Kappos
*Director of the United States Patent and Trademark Office*